Patented Oct. 4, 1927.

1,644,446

UNITED STATES PATENT OFFICE.

BERNHARD RAPP, OF DARMSTADT, GERMANY.

SHADOW-PRODUCING AGENT AND PROCESS FOR MAKING THE SAME.

No Drawing. Application filed May 17, 1926, Serial No. 109,801, and in Germany January 19, 1925.

Kestle (Fortschritte auf dem Gebiete der Röntgenstrahlen, Vol. XI, No. 4, page 271) states that shadows produced by salts of bismuth together with mucilage, such as tragacanth, are useless for all practical purposes, and barium sulphate as obtainable in commerce behaves in the same way as the bismuth salts. Recent experiments have shown that a shadow-producing agent which as regards its capability of forming a uniform coating on the wall of the stomach fulfils all modern requirements, may be obtained from commercial barium sulphate and mucilage by anchoring these to paraffin (vide German Letters Patent No. 295,124).

On the other hand, experience has shown that fastidious patients refuse to take shadow-producing meals prepared in the manner as described above, owing to the unpleasant paraffin taste. Now it has been surprising to find that excellent shadow-producing agents in every way fulfilling modern requirements may be obtained without the use of paraffin by mixing shadow-producing substances precipitated cold or at room temperature, e. g., barium sulphate precipitated cold, with sugar, dextroses, levuloses, or some of the higher alcohols, such as erythrite or mannite, and drying rapidly. The dried powder thus obtained is either mixed with dried and powdered mucilage, and stirred in water when required for use, or the fluid mucilage is added straightaway and a suitable mixture prepared.

*Example.*

As much barium sulphate, freshly precipitated and freed from excess of moisture, as corresponds to 100 parts of the dry precipitate is intimately mixed with 12,5 parts of sugar (powder or fine crystallized). This is thinned down with just enough water to allow the mixture being spread in a thin layer and dried at between 70° to 100° C. The preparation thus obtained is finely ground and passed through a sieve.

Instead of barium sulphate any other shadow-producing agent precipitated from aqueous solution may be taken.

I claim:

1. The process for preparing a shadow-producing agent which consists of freshly precipitating barium sulphate, removing therefrom the excess of moisture, then mixing intimately therewith, while still moist, a finely subdivided sugar, spreading the said mixture in a thin layer, drying the same at a temperature of between 70° to 100° C., and then finely powdering the dried material and passing through a sieve.

2. The process for preparing a shadow-producing agent which consists of freshly precipitating a shadow-producing salt, removing therefrom the excess of moisture, then mixing intimately therewith, while still moist, a finely subdivided sugar, spreading the said mixture in a thin layer, drying the same at a temperature of between 70° to 100° C., and then finely powdering the dried material and passing through a sieve.

3. The process for the preparation of shadow-producing agents comprising the steps of precipitating a shadow-producing salt, intimately mixing therewith, when freshly precipitated and while still moist, a sugar and water in quantity sufficient to produce a semi-fluid mass, then rapidly drying the same by the addition of finely powdered mucilaginous material.

4. A shadow-producing preparation consisting of a mixture of a shadow-producing salt, a sugar, and mucilaginous material.

5. A shadow-producing preparation consisting of a mixture of 100 parts of barium sulphate, 12.5 parts of cane sugar, and gum tragacanth.

6. A shadow-producing preparation consisting of a mixture of barium sulphate and sugar.

In testimony whereof I have hereunto signed my name.

BERNHARD RAPP.